(12) United States Patent
Westerberg

(10) Patent No.: US 6,304,810 B1
(45) Date of Patent: Oct. 16, 2001

(54) METHOD AND DEVICE FOR CRUISE CONTROL

(75) Inventor: Anders Westerberg, Västra Frölunda (SE)

(73) Assignee: Volvo Personvagnar AB (SE)

( * ) Notice: Subject to any disclaimer, the term of this patent is extended or adjusted under 35 U.S.C. 154(b) by 0 days.

(21) Appl. No.: 09/723,060

(22) Filed: Nov. 27, 2000

Related U.S. Application Data

(63) Continuation of application No. PCT/SE99/00842, filed on May 18, 1999.

(30) Foreign Application Priority Data

May 28, 1998 (SE) ...................................................... 9801894

(51) Int. Cl.⁷ .................................................. B60K 31/04
(52) U.S. Cl. .............................. 701/93; 701/94; 701/96; 701/97
(58) Field of Search .................................. 701/91, 93, 94, 701/96, 97, 95, 110; 180/169, 170, 171

(56) References Cited

U.S. PATENT DOCUMENTS

| | | | |
|---|---|---|---|
| 4,814,991 | 3/1989 | Tada et al. | 701/93 |
| 5,251,138 | 10/1993 | Katayama | 701/95 |
| 5,479,349 | 12/1995 | Katayama | 701/93 |
| 6,178,372 | * 1/2001 | Tabata et al. | 701/97 |
| 6,202,780 | * 3/2001 | Tanaka et al. | 180/179 |

* cited by examiner

Primary Examiner—William A. Cuchlinski, Jr.
Assistant Examiner—Marthe Marc-Coleman
(74) Attorney, Agent, or Firm—Kilpatrick Stockton LLP

(57) ABSTRACT

Arrangement and method for providing cruise control in an automotive vehicle that includes determination of a target value $v_{tar}$, stating a desired velocity of the vehicle, determination of an actual value $v_{act}$ stating the current speed of the vehicle. Repeated calculation of an integrated control factor $I_p^{(n)}$ in dependence of the current difference between said actual value $v_{act}$ and said target value $v_{tar}$, and generation of an output signal, α, from a control unit 1 in dependence of the size of said control factor $I_p^{(n)}$. The output signal is utilized for controlling the vehicle engine 2 to a corresponding output torque. The integrated factor $I_p^{(n)}$ is limited to a maximum value, preselected in dependence of the current rotational speed (n) of said engine 2. The invention also relates to a device for cruise control.

8 Claims, 2 Drawing Sheets

METHOD AND DEVICE FOR CRUISE CONTROL

RELATED PATENT APPLICATIONS:

This is a continuation patent application of International Application Number PCT/SE99/00842 filed May 18, 1999 entitled METHOD AND DEVICE FOR CRUISE CONTROL and which designates the United States, the disclosure of which, in its entirety, is expressly hereby incorporated by reference.

TECHNICAL FIELD

The present invention relates to a method for affecting cruise control in a vehicle. More particularly, the invention relates to a method and arrangement for providing cruise control in a passenger vehicle.

BACKGROUND OF THE INVENTION

In connection with automotive vehicles, especially passenger cars, constant speed control devices (also called cruise control devices) are known for automatic control of the vehicle's speed in relation to a pre-set target value. Such cruise control functions will normally be included as a function of a computerized control unit in the vehicle. A setting device, by which the driver can set a target value corresponding to the desired vehicle speed, is connected to the control unit. The control unit is adapted to control the operation of the vehicle's engine, dependent upon the currently set target value, in such a manner that the vehicle will reach the speed corresponding to the target value. This control is performed in dependance of various operating parameters of the vehicle, such as, for example, the current engine load.

The control towards the set target value is normally performed by comparison of a signal corresponding to the target value with an actual value; that is, a current value of the vehicle's speed, whereby the latter value can be determined by an existing speedometer provided in the vehicle. Depending on the difference existing between the actual value and the target value at the time of measurement, the vehicle fueling throttle can be set to a certain angular position. This angular position in turn corresponds to a certain amount of air supplied to, and thus to a certain output torque from, the engine. In this manner, the desired target value regarding vehicle speed can be reached. In such a manner the throttle can be controlled mechanically, or may alternatively consist of an electrically controlled throttle, also called an "E throttle." In the latter case, the throttle angle is adjusted by a servomotor connected to the control unit and coupled to the throttle.

Cruise control may also be performed by means of a control method utilizing what is referred to as a P controller; that is a controller based on proportional control. This type of controller multiplies, in the control unit, the difference between the present actual value and the target value by a predetermined gain factor. This provides an output value that is subsequently used by the control unit for adjusting the throttle.

The P control method discussed above may advantageously be complemented by an integrating factor; i.e., so as to obtain a PI controller. An output value is calculated, in the control unit, which consists of the sum of a proportional portion (a "P portion") and an integrated portion (an "I portion") in which the latter portion is based on an integration of the difference between the vehicle velocity and the target value, over time. This total output value is then utilized for adjusting the throttle angle to a desired value.

When cruise control is used in a vehicle, a driving situation may sometimes occur demanding a torque increase from the engine, which in turn corresponds to a demand for an increased airflow to the engine. Such a situation might for example occur if the vehicle, after being driven on level ground with a moderate load and at constant speed, reaches a steep uphill slope. With a cruise control based on previously known PI regulators, in such a situation, the proportional portion, as well as the integrated portion will increase successively at this stage, as the current actual value will fall below the target value as the vehicle reaches such an uphill slope. An increase of the proportional and the integrated portions will of course also lead to an increase of the sum of these two control factors. According to known techniques, an increase of this sum corresponds to an increase of the throttle angle. This entails a successive opening of the throttle until the vehicle speed reaches the set target value again. In this context, however, it should be noted that in today's vehicles there is normally a relationship between the set throttle angle and the amount of air supplied, which entails that after having increased the throttle angle up to a certain value (for example in connection with the situation described above), any further increase of this angle will not provide any further substantial increase in the amount of air fed into the engine. This also means that an increased angle will not provide any substantial increase in the engine's output torque. Vice versa, the above relationship entails, that when the integrated portion (and consequently also the throttle angle) decreases from a state of very large throttle angle, there will initially not be any substantial decrease in the amount of air and thus neither any substantial decrease of the engine torque.

The above situation may then lead to the following problem: If the vehicle, after being driven at a high torque, reaches a condition requiring a relatively low torque, (which could be said to correspond to the vehicle reaching the crest of the hill after being driven uphill for a distance during which the throttle angle would be relatively large) there will continue to be a high torque output from the engine causing the vehicle to accelerate rapidly. This is registered by the control unit, as the actual value then exceeds the target value, and will in turn lead to a decrease of the integrated portion, as well as the proportional portion of the value calculated by the PI controller. This will also cause the throttle angle to decrease. Accordingly, this decrease will, however, entail only a very slow decrease of the supplied amount of air, and thus torque, as the integrated portion was previously allowed to rise to a very high value during the demand for increased engine torque. As a consequence of the relationship existing between the set throttle angle and the amount of air fed to the engine, the engine output torque will thus be generally constant for a relatively long period of time, while the integrated portion decreases. This causes the vehicle to accelerate rapidly after having reached the crest of the hill, which is, of course, a disadvantage.

According to known techniques, the above problem can be solved at least in part by arranging the control unit to limit the integrated portion to a maximum allowed value.

In view of the above described deficiencies associated with conventionally designed methods and devices for providing cruise control in a vehicle, the present invention has been developed. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventionally designed methods and devices for providing cruise control in a vehicle and incorporates several additional beneficial features.

It is therefore an object of the present to provide an improved method for cruise control, by which the problem described above regarding unwanted acceleration, is solved.

The method, according to the invention, is intended for cruise control in an automotive vehicle. The method includes determining a target value corresponding to a desired speed of the vehicle and determination of an actual value of the current speed of the vehicle. Then repeated calculations of an integrated control factor in dependence of the current difference between the actual value and the target value are made. From this, an output signal is generated from a control unit in dependence upon the size of the control factor. The output signal is then utilized for controlling the vehicle's engine to a corresponding output torque. The invention also provides a maximum limitation on the integrated control factor which is preselected in dependence on the current rotational speed of the engine.

Preferably, the invention is implemented in such a way that the output signal is utilized for adjusting a corresponding angle of an engine fueling throttle. By making the maximum value of the integrated factor speed dependent, a substantial advantage is achieved by always obtaining a quick and efficient engine torque decrease during any decrease in the throttle angle.

The beneficial effects described above apply generally to the exemplary methods and devices for providing cruise control in a vehicle disclosed herein. The specific structures and steps through which these benefits are delivered will be described in detail hereinbelow.

BRIEF DESCRIPTION OF THE DRAWINGS

The invention will now be described in greater detail in the following way, by example only, and with reference to the attached drawings, in which.

DETAILED DESCRIPTION OF THE INVENTION

As required, detailed descriptions of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
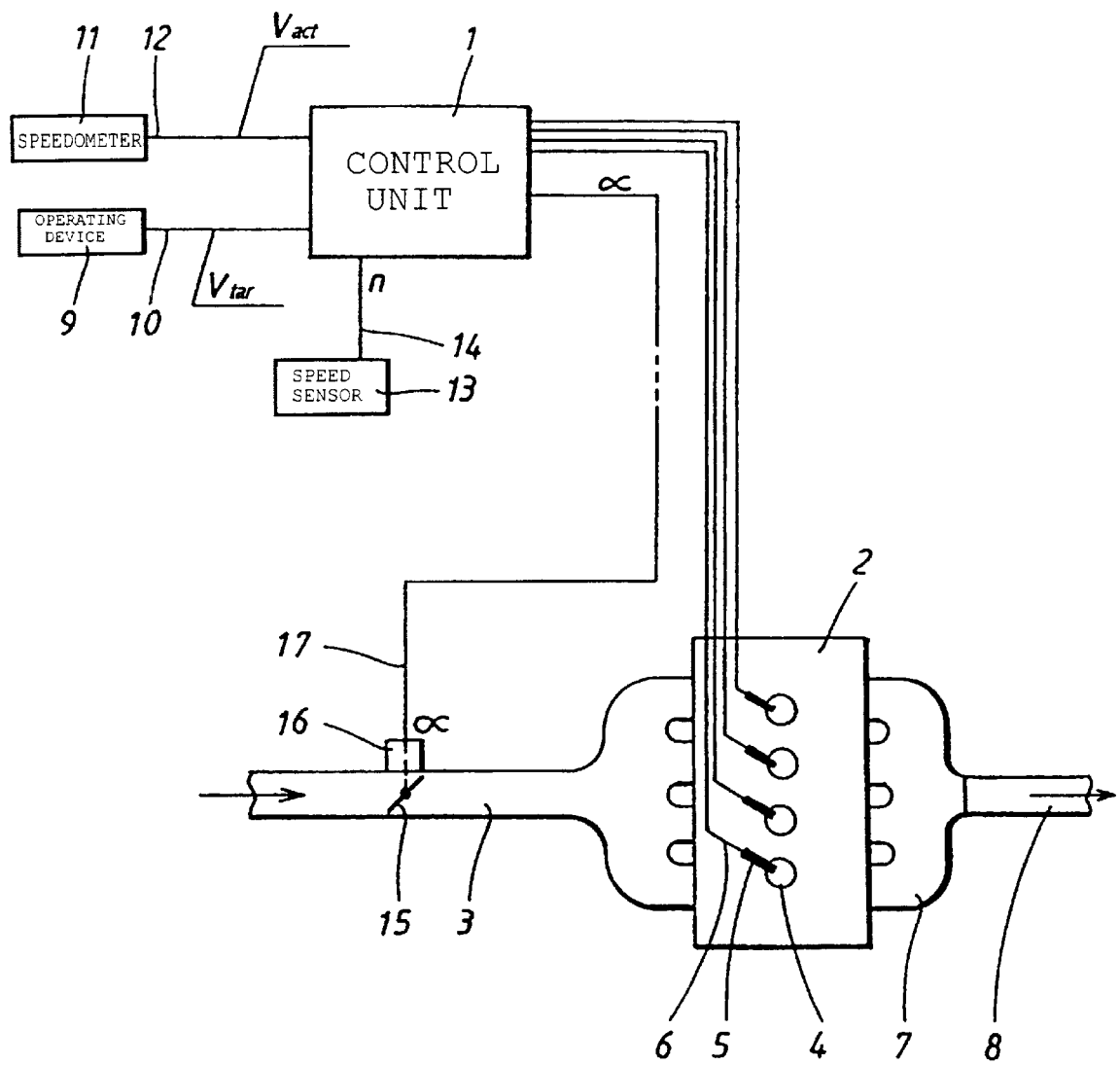
FIG. 1 schematically illustrates an arrangement in which the present invention can be implemented.

Referring to the Figures, FIG. 1 schematically illustrates an arrangement by which the present invention may be implemented. According to a preferred embodiment, the arrangement is intended for an automotive vehicle; for example, a passenger car. The arrangement includes a central control unit 1, which is preferably computer based, and may be provided as a function of an existing computer unit in the vehicle utilized for controlling various vehicle functions such as the fuel supply to a combustion engine 2. According to the illustrative embodiment, the engine 2 is a conventional petrol engine.

The engine 2, shown in a simplified form in FIG. 1, is supplied with inflowing air via an air inlet 3. The engine 2 is further equipped with a number of cylinders 4 and a corresponding number of injection devices 5 for supplying fuel to the cylinders 4. Each fuel injection device 5 is connected to the control unit 1 by means of an electrical connection 6.

The control unit 1 functions in a known manner to control the supply of fuel to each injection device 5 from a fuel tank (not shown) in such a manner that during operation a suitable air/fuel mixture is supplied to the engine 2 and consumed therein. The control of the engine 2 is performed in dependence of various parameters indicating the operating conditions of the engine 2 and of the vehicle in question. For example, the engine control may be performed in dependence of current throttle actuation, engine speed, the amount of air injected into the engine, and the oxygen concentration of the exhaust gases. This type of engine control is known and will therefore not be described in detail.

The exhaust gases from the engine 2 are led from each cylinder 4 by way of a manifold 7 and on to an exhaust pipe 8 connected to the manifold 7. Further downstream along the exhaust pipe 8, there may also be other (not shown) components provided, for example an exhaust gas catalytic converter, a lambda sonde and a silencer.

The control unit 1 functions to provide cruise control for the vehicle based on driver input. With the aid of an operating device 9, the driver is allowed to enter a value corresponding to a speed, $v_{tar}$, with which the vehicle should be driven. This operating device 9 consists of a control switch, preferably located close to the vehicle steering wheel or dashboard (not shown), and connected to the control unit 1 via an electrical connection 10.

A speedometer 11 is further connected to the control unit 1 via another connection 12, providing the control unit 1 with a signal indicating the actual speed, $v_{act}$, of the vehicle. Besides this, there is a speed sensor 13 connected to the control unit 1 via a further connection 14, thereby providing the control unit 1 with a signal indicating the current rotational speed, n, of the engine 2.

According to this preferred embodiment, the control unit 1 is arranged for cruise control utilizing a so-called PI control, in which an output value, S, is calculated at regular intervals. This output value, S, is calculated as the sum of a proportional portion $P_p$ and an integrated portion $I_p$. In accordance with what will be described in greater detail hereinbelow, this output value, S, creates an output signal from the control unit 1 that is used for adjustment of a fueling throttle 15 provided at the air inlet 3 of the engine 2. The throttle 15 is preferably operated electrically and is to this end provided with a controllable servomotor 16. With the aid of the controllable servomotor 16, the throttle 15 may be set to a certain desired angular position, $\alpha$, for feeding a suitable amount of air to the engine 2 in dependence of the current operating conditions. The servomotor 16 is thus connected to the control unit 1 via another connection 17. For controlling the throttle 15, the system also comprises a position sensor (not shown) for sensing the position of the vehicle throttle pedal.

The control unit 1 is functioning, at periodically reoccurring occasions, to calculate the proportional portion $P_p$, as well as the integrated portion $I_p$. The proportional portion $P_p$, is, on every calculation occasion, proportional to the difference between the current actual value $v_{act}$ and the set target value $v_{tar}$, which may be represented as:

$$P_p = P_{gain}(v_{tar} - v_{act})$$

where $P_{gain}$ is a predetermined gain factor. Furthermore, a current value of the integrated portion $I_p^{(n)}$ is calculated through a repeated calculation based on a previous value of the integrated portion $I_p^{(n-1)}$, to which is added an increment proportional to the difference between the current actual value $v_{act}$ and the set target value $v_{tar}$, which may be represented as:

$$I_p^{(n)} = I_p^{(n-1)} + I_{gain}(v_{tar} - v_{act})$$

where $I_{gain}$ is a predetermined gain factor. The current value of the integrated portion, $I_p^{(n)}$, is calculated at predetermined, periodical intervals, preferably being of the order of one or two milliseconds. At every calculation occasion, a total value, S, is thus defined according to the relationship:

$$S = P_p + I_p^{(n)}$$

whereby the total value, S, thus corresponds to a signal that is in turn utilized for adjusting the throttle 15 to a corresponding angle $\alpha$. This signal is output from the control unit 1 to the servomotor 16 of the throttle 15 (see FIG. 1).

The function of the invention will now be described with reference to FIG. 2. This figure shows a diagram illustrating the relationship between the set throttle angle, $\alpha$, and the amount of air, Q, fed to the engine 2. A certain amount of air in turn corresponds to a certain output torque from the engine. The diagram shows three different curves, corresponding to three different speeds, $n_1$, $n_2$ and $n_3$, respectively, of the engine 2, whereby $n_2 > n_1$, $n_3 > n_1$ and $n_3 > n_2$.

From the diagram it may be appreciated, that, for a given engine speed, n, there is a predefined relationship between the throttle angle, $\alpha$, and the amount of air, Q. From the diagram it can be further appreciated that the higher the engine speed, n, the larger the difference in air amount, Q, between an operating condition with relatively small throttle angle, $\alpha$, and an operating condition with relatively large throttle angle, $\alpha$. The latter operating condition is then characterized in that a further increase of the throttle angle, $\alpha$, will not provide any substantial further addition of air amount, Q.

When the vehicle is in a condition in which cruise control has been initiated, the control unit 1 will thus, in periodically recurrent steps (n, n+1, n+2, . . . ) calculate the output value, S, according to the above description. During continuous driving of the vehicle at a certain rotational speed, $n_1$, and a set desired speed, $v_{tar}$, the control unit 1 will adjust the throttle angle , $\alpha$, to such a value that this desired speed $v_{tar}$ is achieved. This condition corresponds to what is designated as point A in FIG. 2. Thus, the actual speed of the vehicle in this condition is equal to the set target value; that is, $v_{act} = v_{tar}$.

When the vehicle arrives into a driving situation requiring a higher torque from the engine, for example when the vehicle reaches a steep uphill slope with a maintained set target value, $v_{tar}$, the vehicle's speed will initially be somewhat reduced. This requires that the proportional portion, $P_p$, as well as the integrated portion, $I_p$, start to increase, thereby contributing to an increased total value, S. This leads to an increased throttle angle, $\alpha$, corresponding to an increased amount of air, Q, being fed to the engine 2. In this way a necessary torque increase is provided, allowing the set target value, $v_{tar}$, to be reached again. This condition corresponds to what is designated as point B in FIG. 2.

The longer time it takes for the vehicle to reach the target value, $v_{tar}$, the further up the curve for the current rotational speed, $n_1$, the point B will be located. For this reason, and against the background of the relationship between the throttle angle, $\alpha$, and the air amount, Q, it is a basic principle behind the present invention, that the integrated portion $I_p^{(n)}$ is limited to a speed-dependent maximum value; i.e., a maximum value being predetermined for each engine speed, or alternatively, a speed range. In the discussed example, this corresponds to the integrated portion, $I_p^{(n)}$, not being allowed, during the control sequence, to rise higher than a maximum value which corresponding to the throttle angle being so large that any further increase thereof would not provide further substantial increase of the air amount, Q. This maximum value may be said to correspond to point C in FIG. 2.

As the proportional portion $P_p$ does not increase to more than a value corresponding to the difference between the set target value $v_{tar}$ and the current actual speed $v_{act}$ (compare above), this portion will be negligible in cases where the integrated portion, $I_p$, has increased to a very high value. According to the invention, there is thus, in principle, no need for limitation of the proportional portion, $P_p$.

If this maximum value had not been chosen and used according to the invention, pursuant to known control schemes, the integrated portion would have continued to increase to a very high value during the above-described phase when the vehicle is striving to achieve the target value, $v_{tar}$. This would lead to the problem(s) described above that are associated with known control methods and devices in which the integrated portion reaches a value corresponding to an excessively large throttle angle which, in the illustrated case, would correspond to a point on the far right of each curve of FIG. 2. When the vehicle subsequently reaches a condition requiring only a low torque, an undesirable acceleration would occur, as the integrated portion would then take a relatively long period of time to drop, which in turn would correspond to a decrease of throttle angle, before any substantial decrease of the amount of air, and consequently engine torque, would be obtained.

According to the present invention, a limit is determined for the value that the integrated portion is allowed to reach during operation at a certain rotational speed. To this end, the control unit 1 is, in advance, provided with stored information that, for a number of different speeds or speed ranges, states a corresponding number of maximum values for the integrated portion. In this way, a certain maximum value is related to a certain corresponding rotational speed or speed range.

Figure 2:
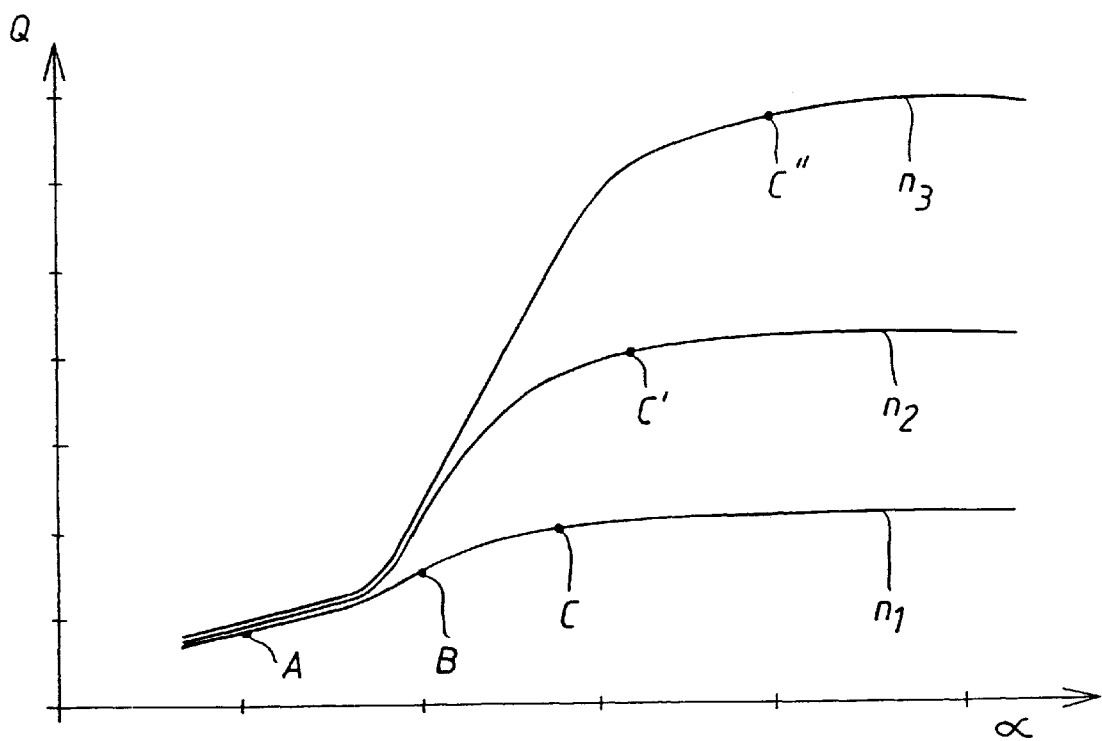
FIG. 2 is a diagram including a plurality of curves defining a relationship between the amount of air supplied to an engine (Q) and the throttle angle setting (a) in the combustion engine based on the principles of the present invention.

With reference to FIG. 2, it can be appreciated that the maximum values allowed for the integrated portion are selected for each speed $n_1$, $n_2$, $n_3$, so as to correspond to certain throttle angles. Furthermore, these maximum values are selected so as to not be located in areas where any further increase of the throttle angle would not yield any substantial further increase of the air amount to the engine. Besides the above-mentioned point C corresponding to a first speed $n_1$, these maximum values correspond on the one hand to the point C', valid for a second speed $n_2$, and on the other to the point C'', valid for a third speed $n_3$. As the integrated portion is not allowed to rise above what corresponds to these points C, C', C'', a decrease of the throttle angle, α, is achieved when the integrated portion is reduced, and a substantial corresponding decrease in the air amount, Q, is achieved when this is necessary.

According to the method of the invention, the above driving situation with an increased torque will entail that the integrated portion is not allowed to rise above its maximum, speed-dependent value. When a lower torque is subsequently required, which, for example, could correspond to the vehicle reaching the crest of an uphill slope, a certain throttle angle and a corresponding air amount will be present. A high output torque from the engine will then prevail, causing the vehicle to start accelerating. This speed increase is sensed by the control unit and will cause a decrease of the integrated portion. As the integrated portion during the previous high torque situation was limited to its maximum value, a decrease of the throttle angle will be achieved very rapidly, so that a rapid decrease of the air amount, as well as decrease in engine output torque is also achieved. For the speed $n_1$, this can be described as going from point C to point B. In this way, the problem occurring with known cruise control methods and arrangements signified by a long acceleration after reaching the crest of the uphill slope, is eliminated.

The values corresponding to the maximum values for the integrated portion are preferably stored as a table in a memory in the control unit 1. Depending on the currently prevailing rotational speed, the control unit 1 can use a relevant maximum value for the integrated portion.

The invention is not limited to the embodiment described above, but may be varied within the scope of the appended patent claims. For example, the number of cylinders, the type of fuel injection, as well as other characteristics of the engine may vary. Furthermore, the fueling throttle may be controlled electrically, as well as mechanically.

As an alternative to using a speedometer for producing an indication of the current vehicle speed, $v_{act}$, this value can be determined indirectly, based upon a measurement of the speed, n, in combination with a signal indicating the presently used gear ratio. One alternative method for indirectly providing a representation of the vehicle speed is to use, if available, a signal from an ABS type brake system, which would then be available via an electrical connection. Also, a representation of the engine speed may be determined indirectly, without using a speed sensor.

Besides those applications where a driver sets a desired target value himself, the invention can also be used in those cases where the control unit is provided with. information about a maximum allowed vehicle velocity.

The gain factors $P_{gain}$ and $I_{gain}$, respectively, may be constant or may alternatively be variable and be determined depending on, for example, the vehicle speed.

Finally, it is contemplated that the invention may also be utilized for other types of regulators, for example a PID regulator.

Arrangements and methods for providing cruise control in a vehicle have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A method for providing cruise control in an automotive vehicle, said method comprising:
   determining a target value, $v_{tar}$, representing a desired velocity of the vehicle;
   determining an actual value, $v_{act}$, representing a current speed of the vehicle;
   calculating an integrated control factor, $I_p^{(n)}$, that is dependent on a current difference between said actual value, $v_{act}$, and said target value, $v_{tar}$;
   generating an output signal, α, from a control unit that is dependent on a value of said control factor, $I_p^{(n)}$, and said output signal, α, being utilized for controlling an engine of the vehicle to a corresponding output torque; and
   limiting said integrated control factor, $I_p^{(n)}$, to a maximum value that is preselected in dependence of a current rotational speed, n, of the engine.

2. The method as recited in claim 1, wherein said output signal, α, is utilized for is adjusting a corresponding angle of a fueling throttle of the engine.

3. The method as recited in claim 1, wherein said maximum value of the integrated control factor, $I_p^{(n)}$, is selected for each speed, n, so that a substantial decrease of the torque of the engine is obtained when decreasing said output signal, α.

4. The method as recited in claim 1, wherein said output signal, α, is determined based on a calculated value, S, consisting of the sum of a proportional control factor, $P_p$, and said integrated control factor, $I_p^{(n)}$.

5. An arrangement for providing cruise control in an automotive vehicle, said arrangement comprising:

a selected speed input device adapted to receive a driver input target value, $v_{tar}$, corresponding to a desired velocity of a vehicle;

an actual speed detection device adapted to determine an actual velocity value, $v_{act}$, corresponding to an actual velocity of the vehicle;

a control unit adapted for repeated calculation of an integrated control factor, $I_p^{(n)}$, in dependence of a current difference between said actual velocity value, $v_{act}$, and said target velocity value, $v_{tar}$, and said control unit being further adapted to generate an output signal, $\alpha$, dependent on a magnitude of said integrated control factor, $I_p^{(n)}$, for controlling an engine of the vehicle to a corresponding output torque; and said control unit including stored information that, in dependence of a current rotational speed, n, of said engine, corresponds to a maximum value of said integrated factor, $I_p^{(n)}$.

6. The arrangement as recited in claim 5, wherein said control unit is connected to, and arranged for adjusting, a fueling throttle of the engine in dependence of said output signal, $\alpha$.

7. An arrangement for providing cruise control in an automotive vehicle, said arrangement comprising:

a means for determining a target value, $v_{tar}$, corresponding to a desired velocity of a vehicle;

a means for determining an actual value, $v_{act}$, corresponding to an actual velocity of the vehicle;

a control unit adapted for repeated calculation of an integrated control factor, $I_p^{(n)}$, in dependence of a current difference between said actual velocity value, $v_{act}$, and said target velocity value, $v_{tar}$, and said control unit being further adapted to generate an output signal, $\alpha$, dependent on a magnitude of said integrated control factor, $I_p^{(n)}$, for controlling an engine of the vehicle to a corresponding output torque; and said control unit including stored information that, in dependence of a current rotational speed, n, of said engine, corresponds to a maximum value of said integrated factor, $I_p^{(n)}$.

8. The arrangement as recited in claim 7, wherein said control unit is connected to, and arranged for adjusting, a fueling throttle of the engine in dependence of said output signal, $\alpha$.

* * * * *